US012595407B2

(12) United States Patent
Zharnikov et al.

(10) Patent No.: US 12,595,407 B2
(45) Date of Patent: Apr. 7, 2026

(54) RADIATION ACTIVATED WELL TREATMENT

(71) Applicant: SAUDI ARABIAN OIL COMPANY, Dhahran (SA)

(72) Inventors: Timur Zharnikov, Moscow (RU); Maxim Orlov, Moscow (RU); Tao Chen, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 264 days.

(21) Appl. No.: 18/248,197

(22) PCT Filed: Apr. 8, 2022

(86) PCT No.: PCT/RU2022/000110
§ 371 (c)(1),
(2) Date: Apr. 6, 2023

(87) PCT Pub. No.: WO2023/195875
PCT Pub. Date: Oct. 12, 2023

(65) Prior Publication Data
US 2025/0084300 A1      Mar. 13, 2025

(51) Int. Cl.
*C09K 8/92* (2006.01)
*C09K 8/536* (2006.01)
(Continued)

(52) U.S. Cl.
CPC ................. *C09K 8/92* (2013.01); *C09K 8/536* (2013.01); *C09K 8/725* (2013.01); *C09K 8/82* (2013.01);
(Continued)

(58) Field of Classification Search
CPC ........................................................ C09K 8/60
See application file for complete search history.

(56) References Cited

U.S. PATENT DOCUMENTS 3,915,704 A      10/1975  Limburg et al.
5,993,374 A      11/1999  Kick
(Continued)

FOREIGN PATENT DOCUMENTS

CN        114085659 A      2/2022
EP         2865423 A2      4/2015
(Continued)

OTHER PUBLICATIONS

International Search Report and Written Opinion issued in Corresponding Applicaiton No. PCT/RU2022/000110, mailed on Jan. 5, 2023, 13 pages.
(Continued)

*Primary Examiner* — William D Hutton, Jr.
*Assistant Examiner* — Avi T Skaist
(74) *Attorney, Agent, or Firm* — Osha Bergman Watanabe & Burton LLP

(57) ABSTRACT

A well treatment composition may include a capsule and a treatment agent solution within the capsule. The treatment agent solution may have a treatment agent. The system may include a radiation source: neutron, gamma, X-ray, and/or ultraviolet. A method may include introducing the well treatment composition downhole in wellbore circulation fluid, and introducing a radiation source into the wellbore and positioning the radiation source. The method may include activating the radiation source and emitting radiation that intermingles with the well treatment composition at a target location. The method may include maintaining the wellbore to allow emitted radiation from the activated radiation source to react with the well treatment composition, forming a radiation activated well treatment composition. The method may include allowing the radiation activated well treatment composition to disintegrate or dissolve,
(Continued)

100 ⌐

102 ⌐
Introducing well treatment composition into a wellbore

104 ⌐
Introducing a radiation source into the wellbore

106 ⌐
Activating the radiation source and emitting radiation at a target location 108 ⌐
Maintaining the wellbore to allow emitted radiation to react with the well treatment composition 110 ⌐
Allowing the radiation activated well treatment composition to disintegrate or dissolve, releasing treatment agent at the target location breaking encapsulation and releasing treatment agent at the target location.

17 Claims, 1 Drawing Sheet

(51) Int. Cl.

| | |
|---|---|
| *C09K 8/72* | (2006.01) |
| *C09K 8/82* | (2006.01) |
| *C09K 8/88* | (2006.01) |
| *E21B 37/06* | (2006.01) |

(52) U.S. Cl.
CPC .............. *C09K 8/882* (2013.01); *C09K 8/885* (2013.01); *E21B 37/06* (2013.01); *E21B 2200/08* (2020.05)

(56)     References Cited

U.S. PATENT DOCUMENTS

| | | | |
|---|---|---|---|
| 6,159,443 | A | 12/2000 | Hallahan |
| 6,444,316 | B1 | 9/2002 | Reddy et al. |
| 7,431,088 | B2 | 10/2008 | Moorehead et al. |
| 8,662,174 | B2 | 3/2014 | Lewis et al. |
| 9,416,619 | B2 | 8/2016 | Aines et al. |
| 10,042,082 | B2 | 8/2018 | Luo et al. |
| 10,093,851 | B2 | 10/2018 | Chang et al. |
| 10,220,000 | B2 | 3/2019 | Fologea et al. |
| 10,501,687 | B2 | 12/2019 | Johnson et al. |
| 10,641,083 | B2 | 5/2020 | Shen et al. |
| 10,866,336 | B2 | 12/2020 | Stoller |
| 11,041,117 | B2 | 6/2021 | Johnson et al. |
| 2003/0031694 | A1 | 2/2003 | Anderson et al. |
| 2009/0304589 | A1 | 12/2009 | Bondurant et al. |
| 2012/0325471 | A1 | 12/2012 | Mukhopadhyay |
| 2013/0000891 | A1* | 1/2013 | Lewis ..................... E21B 33/14 166/247 |
| 2014/0069644 | A1 | 3/2014 | Reddy et al. |
| 2015/0110867 | A1 | 4/2015 | Floyd et al. |
| 2016/0017215 | A1* | 1/2016 | Al-Muntasheri ...... C09K 8/882 507/225 |
| 2018/0255632 | A1 | 9/2018 | Navarro-Sorroche et al. |
| 2018/0305609 | A1* | 10/2018 | Hall ......................... C09K 8/60 |
| 2021/0222045 | A1 | 7/2021 | Fuller et al. |

FOREIGN PATENT DOCUMENTS

| | | |
|---|---|---|
| RU | 2311439 C2 | 11/2007 |
| WO | 2019135939 A1 | 7/2019 |

OTHER PUBLICATIONS

Sen et al., "Effect of gamma irradiation conditions on the radiation-induced degradation of isobutylene-isoprene rubber," Nuclear Instruments and Methods in Physics Research B 208 (2003) 480-484, 5 pages.

Suarez et al., "Study of the effect of gamma irradiation on polyolefins-low-density polyethylene," Polymer Degradation and Stability 75 (2002) 143-151, 9 pages.

E. Yousif and R. Haddad, "Photodegradation and photostabilization of polymers, especially polystyrene: review," SpringerPlus 2013, 2:398, 33 pages.

L.A. Wall and D.W. Brown, "Gamma Irradiation of Polymethyl Methacrylate and Polystyrene," The Journal of Physical Chemistry, 1957, 61, 2, 129-136, 8 pages.

Office Action issued in corresponding Russian Application No. 2024129915; dated Sep. 19, 2025 (8 pages).

* cited by examiner

100

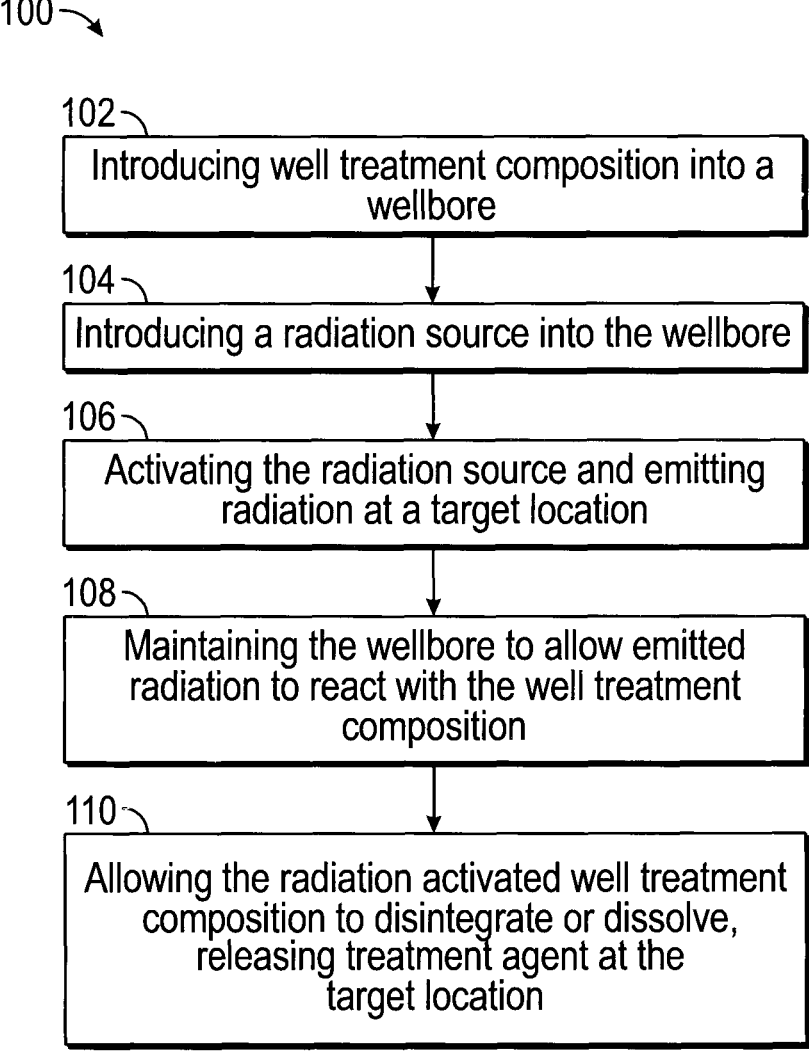

102

Introducing well treatment composition into a wellbore

104

Introducing a radiation source into the wellbore

106

Activating the radiation source and emitting radiation at a target location

108

Maintaining the wellbore to allow emitted radiation to react with the well treatment composition

110

Allowing the radiation activated well treatment composition to disintegrate or dissolve, releasing treatment agent at the target location

RADIATION ACTIVATED WELL TREATMENT

BACKGROUND

In oil and gas operations, fluid treatments are distributed to wellbore for various purposes. In general, well treatments ensure that hydrocarbons flow efficiently from a formation into a wellbore. Purposes for treatments include cleaning, disrupting sludge and scale that has built up, stimulating, and removing or opening up blockages in formation passages.

Existing treatments may use excessive amounts of fluids or active reagents. These existing treatments may expose active reagents to portions of a wellbore other than a target location, may require shutting in the well for a long period, or may use additional equipment, such as slickline or a wireline tool.

SUMMARY

This Summary is provided to introduce a selection of concepts that are further described in the Detailed Description. This Summary is not intended to identify key or essential features of the claimed subject matter, nor is it intended to be used as an aid in limiting the scope of the claimed subject matter.

In one aspect, one or more embodiments disclosed relate to a system, comprising a well treatment composition that may comprise a capsule and a treatment agent solution within the capsule. The treatment agent solution may include a treatment agent comprising one or more selected from the group consisting of a scale dissolver, a scale inhibitor, a hydrate inhibitor, a halite inhibitor, a corrosion inhibitor, a biocide, a wax control substance, an asphaltene control substance, a demulsifier, a gel breaker, a drag reducer, an oxygen scavenger, a foaming agent, a surfactant, an acid treatment, and a well clean up substance. The system may include a radiation source comprising one or more selected from the group consisting of a neutron source, a gamma source, an X-ray source, and an ultraviolet source.

In another aspect, one or more embodiments disclosed relate to a method of treating a wellbore or a hydrocarbon formation. The method may comprise introducing a well treatment composition comprising an encapsulated treatment agent downhole to a target location in wellbore circulation fluid. The method may comprise introducing a radiation source into the wellbore and positioning the radiation source at the target location. The method may comprise activating the radiation source and emitting radiation that intimately intermingles with the well treatment composition at the target location. The method may also comprise maintaining the wellbore to allow emitted radiation from the activated radiation source to react with the well treatment composition, thereby forming a radiation activated well treatment. Further, the method may comprise allowing the radiation activated well treatment to disintegrate or dissolve, thereby breaking encapsulation and releasing treatment agent at the target location.

Other aspects and advantages of the claimed subject matter will be apparent from the following Detailed Description and the appended Claims.

BRIEF DESCRIPTION OF DRAWINGS

FIG. 1 shows a method of treating a wellbore or a hydrocarbon formation according to one or more embodiments.

DETAILED DESCRIPTION

One or more embodiments of the present disclosure relates to a system and a method for targeted treatment of a wellbore. A targeted well treatment delivers an active reagent to a target location in a wellbore.

A targeted well treatment may be performed for several reasons. A precipitate may form scales on a wellbore wall, thereby obstructing fluid flow from the formation, through the wellbore, or both from the formation and through the wellbore. A targeted well treatment may remove scale (buildup or deposits) through breaking up the deposited material. Removing scale in a targeted manner increases efficiency of the process and reduces the overall amount of treatment that is used compared to an un-targeted treatment.

Acid stimulation of a formation involves directly injecting a strong acid, such as hydrochloric acid (HCl) or hydrofluoric acid (HF), into the wellbore. Acid stimulation may dissolve secondary minerals or materials in the drilling mud including but not limited to bentonite or polymers and may mobilize these materials to free up flow transport in the formation or wellbore. However, the reactivity of a strong acid may result in rapid consumption of the acid before it reaches the target treatment region. Further, these acids are corrosive and may attack metal parts of the well structure and downhole tools, causing collateral damage. These inadequacies may be overcome by a targeted well treatment of acid stimulation.

In one or more embodiments, a radiation activated well treatment, also called a radiation activated well treatment composition, is provided by the system and the method. The system is used to deliver a well treatment (well treatment composition) downhole and to activate the well treatment with a radiation source that is also downhole, resulting in a radiation activated well treatment. The method includes a sequence of steps to introduce, target, and activate the well treatment downhole.

For example, a well treatment may be triggered with radiation. When the well treatment and radiation source are downhole in the wellbore adjacent to the target location, such a system may be utilized to target the treatment precisely. The well treatment may include a capsule with a shell comprising a polymer that degrades upon exposure to radiation. The well treatment, degradable when irradiated, may release an active reagent held within, for example, a capsule to effect the treatment.

System

In one or more embodiments, the system includes a well treatment comprising a delivery fluid, a capsule, a treatment agent solution encapsulated in the capsule, and a radiation source. The well treatment composition may be added to wellbore circulation fluid. The treatment agent solution comprises an active chemical ingredient, to be described.

The delivery fluid may be water, or a mixture of water and a surfactant. Examples of a delivery fluid surfactant include, but are not limited to, an alkoxylated compound; a quaternary ammonium salt; an organosulfate; an ethoxylate including a sulfur atom, such as a sulfonated ethoxylated compound; a zwitterionic; and a combination thereof.

The capsule may be within a size range of from 1 to 10 millimeter (mm) at its widest dimension (whether it be length, width, or height). When the capsule is from 1 to 1,000 micrometers (μm), it may be called a microcapsule.

A capsule may include a shell defining an open space within the shell (an interior of the capsule) that is configured to retain a treatment agent solution until activated. The interior of the capsule may be a volume of from about 1 µL to about 1 mL. Thus, the capsule is configured to retain a volume of from about 1 µL to about 1 mL. The shell may comprise a polymer, called a polymer shell. The polymer shell may be configured to degrade in presence of radiation, to be described. The capsule may be a hardened capsule or a gelled capsule (appreciated in the art as a gel cap). The thickness of the shell may be from about 100 nm to about 100 µm.

The polymer shell of the capsule may comprise a polymerization product of a monomer including, but not limited to, a melamine-formaldehyde, an urea-formaldehyde, a phenol-formaldehyde resin, a melamine-phenol-formaldehyde resin, a furan-formaldehyde resin, an epoxy resin, a polysiloxane, a polyacrylate, a polyester, a polyurethane, a polyamide, a polyether, a polyimide, a polyolefin, a polypropylene-polyethylene copolymer, a polystyrene, a functionalized polystyrene derivative, a gelatin, a gelatin derivative, a cellulose, a cellulose derivative, a starch, a starch derivative, a polyvinyl alcohol, an ethylene-vinylacetate copolymer, a maleic-anhydride based copolymer, a polyacrylamide, a polyacrylamide based copolymer, a polyacrylic acid, a polyacrylic acid based copolymer, a polyvinylpyrrolidone, a polyvinylpyrrolidone based copolymer, a polyacrylate based copolymer, a propylene-acrylate copolymer, a propylene-methacrylate copolymers, an oxidized polypropylene, an oxidized polyethylene, a propylene-ethylene oxide copolymer, a styrene-acrylate copolymer, an acrylonitrile-butadiene-styrene copolymer, or a combination thereof.

The treatment agent solution within the capsule may include an emulsion, a suspension, or a polymer filler, where each type of treatment agent solution comprises a treatment agent.

The term "emulsion" is used to describe a fine dispersion of droplets of a first liquid in a second liquid in which the droplets are not soluble or miscible. The term emulsion, as used herein may include a microemulsion, a mini-emulsion, or a macroemulsion.

The average diameter of droplets in the dispersed phase of a microemulsion may be from about 1 micrometer (1 µm, $10^{-6}$ m) to about 1 millimeter (1 mm, $10^{-3}$ m). The average diameter of droplets in a macroemulsion (a 'normal' emulsion) may be greater than 1 millimeter (1 mm, $10^{-3}$ m). The average diameter of droplets in a nanoemulsion may be less than 1 micrometer (1 µm, $10^{-6}$ m).

An emulsion may be an oil-in-water emulsion (O/W) that is a discontinuous internal oil phase in a continuous water phase, a water-in-oil emulsion (W/O) that is a discontinuous internal water phase in a continuous oil phase, or an internal phase that is itself a dispersion such as a water-in-oil-in-water emulsion (W/O/W) or an oil-in-water-in-oil emulsion (O/W/O). The internal phase of the emulsion may include a treatment agent. An emulsion may be added to the interior of a capsule. Thus, the composition may include an encapsulated emulsion.

In one or more embodiments, an emulsion is a Pickering emulsion. A Pickering emulsion is stabilized by solid particles such as surface-active nanoparticles. For example, solid particles in a Pickering emulsion may adsorb at the interface between two phases of the emulsion. Thus, solid particles such as nanoparticles may be incorporated in a capsule when the capsule includes an emulsion therein. One example of a solid particle that may be incorporated is a stabilizer such as nanosilica, nanoclay, modified nanosilica or nanoclay, or a combination thereof.

A suspension may include a solid material, such as a treatment agent, suspended in a liquid. The components of the suspension itself may not be influenced by a radiation source. A suspension may be added to the interior of a capsule. Thus, the composition may include an encapsulated suspension comprising a treatment agent. Suitable examples of an additional solid material in a suspension may include but are not limited to ethylenediaminetetraacetic acid (EDTA), diethylenetriaminepentaacetic acid (DTPA), tetrasodium glutamate diacetate (GLDA), sulfamic acid, and a combination thereof. Suitable examples of a liquid component in a suspension may include but are not limited to acetone, benzene, methanol, diethyl ether, and a combination thereof.

The treatment agent may be embedded in a polymer filler. The polymer filler may be encapsulated by a capsule surrounding the filler. The polymer filler may be an addition polymer of vinyl monomers or a condensation polymer of monomers, a condensation polymer of prepolymers, or a combination thereof, to be described. The Suitable examples of vinyl monomers include, but are not limited to, acrylamide, acrylic acid, acrylic esters, methacrylic acid, methacrylic esters, styrene, 4-vinylbenzyl chloride, divinylbenzene, methylenebisacrylamide, or a combination thereof.

Suitable examples of a condensation polymer of monomers include but are not limited to melamine-formaldehyde resin, phenol-formaldehyde resin, urea-formaldehyde resin, epoxy resin, urethane resin, urea resin, urethane/urea resin, polyester resin, or a combination thereof. When a urea-formaldehyde resin is included, the formaldehyde to urea molar ratio value may exceed 0.94:1.

Suitable examples of a condensation polymer of prepolymers include but are not limited to a methylene diphenyl diisocyanate (MDI)-based prepolymer, a toluene diisocyanate (TDI)-based prepolymer, or a combination thereof (for isocyanate chemistry).

The system includes a treatment agent. The treatment agent may be a compound that is introduced into a wellbore to mitigate an undesired effect in the wellbore or reservoir. An undesired effect may be caused by conditions including, but not limited to, scale formation, salt formation, paraffin deposition, emulsification (of an undesired emulsion), gas hydrate formation, corrosion, asphaltene precipitation, paraffin formation, or a combination thereof. An "undesired emulsion" used herein is an emulsion of oil components in the wellbore or reservoir, such as naphthenic and asphaltenic acids, or due to formation damage by drilling mud components, and may be a water-in-oil or oil-in-water emulsion.

When the treatment agent is encapsulated in, for example, a capsule it may be called an "encapsulated treatment agent." The capsule may include the encapsulated treatment agent, or one or more of the encapsulated treatment agent, emulsion, suspension, and polymer filler.

A treatment agent may include, but is not limited to, a scale dissolver, a scale inhibitor, a hydrate inhibitor, a halite inhibitor, a corrosion inhibitor, a biocide, a wax control substance, an asphaltene control substance, a demulsifier (to be used with an undesired emulsion), a gel breaker, a drag reducer, an oxygen scavenger, a foaming agent, a surfactant, an acid, an acid precursor, and a well clean up substance (such as an enzyme, organic molecule, acid, ester, or aliphatic compound), or a combination thereof.

A well clean up substance as used herein is used to remove sediments formed during the production process that includes scale build up, paraffins, or other substances that may build up in a well or reservoir. A well clean up substance may include but is not limited to acidic components used to remove salts, for example. An acidic treatment however may also be used to enhance the production of oil, and one of ordinary skill in the art would appreciate the difference between a well clean up substance and substances used for other purposes.

A scale dissolver is a chemical that is used to break apart or dissolve scale, sludge, or buildup. The scale dissolver may be an acid-based scale dissolver, a chelant-based scale dissolver, or a combination thereof.

An acid-based scale dissolver may include, but is not limited to, hydrochloric acid, acetic acid, formic acid, citric acid, lactic acid, methanesulfonic acid (MSA), or a combination thereof.

A chelant-based scale dissolver may include, but is not limited to, ethylenediaminetetraacetic acid (EDTA), diethylenetriaminepentaacetic acid (DTPA), tetrasodium glutamate diacetate (GLDA), nitrilotriacetic acid (NTA), citrate, pyrophosphate ($P_2O_7$), tetrakis(hydroxymethyl)phosphonium sulfate (THPS), or a combination thereof. A chelant-based scale dissolver may dissolve scale, for example, by trapping a salt or other component within the scale including but not limited to $CaCO_3$, $CaSO_4$, $MgCO_3$, or a combination thereof.

A scale inhibitor is a chemical that prohibits or inhibits the build-up of scale and sludge. A scale inhibitor may include, but is not limited to, polyphosphate, 1-hydroxyethylidene-diphosphonic acid (HDEP), ethane-1,2-diphosphonic acid (EDPA), diethylenetriaminepenta(methylenephosphonic acid) (DETPMP), tris(phosphonomethyl)amine, nitrilotrimethylphosphonic acid, aminotris(methylphosphonic acid) (ATMP), bis(hexamethylenetriaminepenta(methylenephosphonic acid)) (BHTMP), 1-hydroxyethylidene-1,1-diphosphonic acid (HEDP), [[(2-hydroxyethyl)imino]bis(methylene)]bisphosphonic acid (MEA/HADMP), polyacrylic acid (PAA), polymaleic acid (PMA), polyphosphinocarboxylic acid (PPCA), polyvinyl sulfonate and polyacrylic acid copolymer (PVS), phosphonocarboxylic acid (POCA) and 2-phosphono-butane-1,2,4-tricarboxylic acid (PBTC), polyamino polyether methylene phosphonae (PAPEMP), polyaspartate, or a combination thereof.

A hydrate inhibitor is a chemical that controls the formation of hydrates in a wellbore. A hydrate inhibitor (such as a gas hydrate inhibitor) may include, but is not limited to, methanol, ethylene glycol, glycopeptides, poly(N-vinylpyrrolidone) (PVP), tyrosine derivatives, terpolymer of N-vinylcaprolactam, N-vinylpyrrolidone and dimethylaminoethylmethacrylate, isobutylene succinate diester of monomethylpolyethylene glycol, hydroxyethylcellulose (HEC), alkyl aryl sulhonic acids, ethoxylated sorbitan monolaurate, alkyl polyglycoside, tetraoxyethylenenonylphenylether, or a combination thereof.

A halite inhibitor may include, but is not limited to, nitrilotriacetic acid (NTA), potassium hexacyanoferrate (HCF), or a combination thereof. A halite inhibitor may mitigate, inhibit, or break up halite formation. For example, a halite (not limited to sodium chloride, NaCl) may be present in high temperature and high pressure wells or reservoirs. Changes in pressure and temperature may cause produced water to evaporate into a gas or a condensate phase, leaving the water stream in a supersaturated state. Supersaturation may cause halite to precipitate. A halite inhibitor may, for example, distort the nucleation and growth of the halite, resulting in dispersion and partial dissolving of the already formed halite (in the form of crystals, scale, etc.). When a halite inhibitor is included, a reduced volume of freshwater may be included in the composition as compared to when a halite inhibitor is not included.

A corrosion inhibitor is a chemical that decreases the corrosion rate of a material, such as a metal or alloy, which comes in contact with a corrosive chemical. A corrosion inhibitor may include, but is not limited to, imidazoline, primary/secondary/tertiary/quaternary amines, n-dodecylamine, N-N-dimethyl dodecylamine, amide, amidoamine, amidoimidazoline, isoxazolidine, succinic acid, carboxylic acid, aldehyde, alkanolamine, imidazoline-imidazolidine compound, α,β-ethylene unsaturated aldehyde, polyalkylenepolyamine, diethylenetriamine, or a combination thereof.

A biocide is a chemical, microorganism, or a mixture thereof that destroys, deters, renders harmless, or exerts a controlling effect on an organism. The organism may include but is not limited to a sulfate-reducing bacteria, a sulfate-reducing archaea, a methanogen, or a combination thereof. One of ordinary skill in the art would appreciate that other organisms, harmful organisms, may be the target of a biocide.

A biocide may include, but is not limited to, glutaraldehyde, tetrakis(hydroxymethyl)phosphonium sulfate (THPS), alkyldimethylbenzylammonium chloride (ADBAC), didecyldimethylammonium chloride (DDAC), tributyl(tetradecyl)phosphonium chloride (TTPC), cocodiamine, 2,2-dibromo-3-nitrilopropionamide (DBNPA), 2-bromo-2-nitro-1,3-propanediol, tetrahydro-3,5-dimethyl-2H-1,3,5-thiadiazinethione, 5-chloro-2-methyl-4-isothiazolin-3-one+2-methyl-4-isothiazolin-3-one (CMIT/MIT), 4,4-dimethyloxazolidine (DMO), 1-(3-chloroallyl)-3,5,7-triaza-1-azoniaadamantane chloride (CTAC), tris(hydroxymethyl) nitromethane (THNM), sodium hypochlorite, ozone, chlorine dioxide, peracetic acid, or a combination thereof.

A wax control substance is a chemical that is a paraffin inhibitor (inhibits agglomeration of paraffins or wax-like substances). A wax control substance may reduce the pour point temperature and viscosity of a mixture.

A wax control substance may include, but is not limited to, poly(ethylene-co-vinyl acetate) (EVA), ethylene/acrylonitrile copolymers, poly(ethylene-b-propylene), poly(ethylene butene) polymers, (meth)acrylic acid and maleic anhydride co-polymers, polyesters, amine ethoxylates, alkyl sulfonates, alkyl aryl sulfonates, fatty amine ethoxylates, or a combination thereof.

An asphaltene control substance is a chemical that inhibits agglomeration of asphaltenes, such as tar, bitumen, or asphalt. An asphaltene control substance may reduce the pour point temperature and viscosity of a mixture.

An asphaltene control substance may include, but is not limited to, xylene, n-butylisoquinolinium chloride ionic liquid, amphiphil P (n-dodecyl)benzene sulfonic acid, vegetable oil, coconut essential oil, sweet almond, andiroba and sandalwood oil, boscan resins, cerro negro resins, 1-allyl-3-hexadécylimidazolium bromide, dodecyl benzene sulfonic acid (DBSA), dodecyl trimethyl ammonium bromide (DTAB), light cycle oil (LCO), $TiO_2$ nanoparticles, surfactant (SDJ), nanofluids of $Al_2O_3$, propoxylated polydodecyl, phenol formaldehyde, octylphenol, dodecyl phenol, 2-hydroxybenzenecarboxylic acid $C_6H_4(OH)COOH$ salicylic acid, or a combination thereof.

A demulsifier is a chemical that breaks an emulsion. That is, a demulsifier separates two or more intermingled phases of an emulsion. A demulsifier may include, but is not limited to, urea, polyethylene glycol, diethylene glycol, propylene glycol, fatty alcohol ethoxylate, monoethylene glycol, triethanolamine, 2-ethyl hexyl acrylate, methacrylic acid, sodium dodecyl sulfate, butyl acrylate, acrylic acid anhydrous, methyl methacrylate, naphthalene, methyl trioctyl ammonium chloride (TOMAC), dioctylamine, or a combination thereof.

A gel breaker is a chemical that breaks up a gel (or gelled mixture) over a period. A gel breaker may reduce the viscosity of the composition compared to when a composition does not include a gel breaker. A gel breaker may include, but is not limited to, enzyme, polyacrylamide, guar, sodium hypochlorite, ammonium peroxide, hydrogen peroxide, or a combination thereof.

A drag reducer is a chemical that reduces turbulence (drag) in a well, pipe, or reservoir. A drag reducer may include, but is not limited to, polyethylene, copolymer of a linear α-olefin with crosslinkers, polyacrylamides, polyalkylene oxide, fluorocarbons, polyalkylmethacrylates, terpolymer of styrene, alkyl acrylate, acrylic acid or methacrylic, or a combination thereof.

An oxygen scavenger is a chemical that captures dissolved oxygen in a chemical reaction that renders the oxygen unavailable for corrosive reactions. An oxygen scavenger may include, but is not limited to, sulfite ($SO_3^{-2}$) and bisulfite ($HSO_3^-$) ions, diethylhydroxylamine (DEHA), or a combination thereof.

A foaming agent is a chemical that facilitates the formation of a foam, such as a surfactant or a blowing agent. A foaming agent may reduce the surface tension of a liquid and produce uniform and stable foam. A foaming agent may include, but is not limited to, azodicarbonamide, inorganic bicarbonates (sodium, potassium, aluminum, iron bicarbonates), sodium dodecyl sulfate, azodicarbonamide, benzenesulfonyl hydrazide, dinitrosopentamethylene tetramine, toluenesulfonyl hydrazide, azobisisobutyronitrile, barium azodicarboxylate, or a combination thereof.

A surfactant is a chemical that adsorbs at an interface between two fluids, lowering the surface tension or interfacial tension between fluids or between a fluid and a solid. A surfactant may include, but is not limited to, sodium dodecyl sulfate, tris(hydroxymethyl)aminoethane dodecyl sulfate, sodium dodecyl sulfonate, sodium cholate, sodium taurocholate, sodium deoxycholate, sodium taurodeoxycholate, sodium N-dodecanoyl-N-methyltaurine, lithium perfluorooctanesulfonate, tetradecyltrimethylammonium bromide, hexadecyltrimethylammonium bromide, carboxybetaine ($-NR_2CH_2COO-$), sulfobetaine ($-N(CH_3)_2C_3H_6SO_3^-$), and quaternary ammonium ($-R_4N^+$), alcohol ethoxylates, alkyl phenol ethoxylates, fatty acid ethoxylates, monoalkaolamide ethoxylates, sorbitan ester ethoxylates, fatty amine ethoxylates, ethylene oxide-propylene oxide copolymers, glycol esters, glycerol and polyglycerol esters, glucosides and polyglucosides, sucrose esters, or a combination thereof.

The treatment agent may include an acid treatment (or acid system). An acid treatment may be a mineral acid, a powdered acid, a mixed acid, a retarded acid, an acid precursor, or a combination thereof.

A mineral acid may include hydrochloric acid, hydrofluoric acid, or a combination thereof.

An organic acid may include formic acid, acetic acid, or a mixture thereof. A powdered acid may include a powdered solid acid, such as sulfamic acid, chloroacetic acid, or a combination thereof.

A mixed acid may include, for example, an acetic-hydrochloric acid mixture or a formic-hydrochloric acid mixture.

A retarded acid may include a gelled acid, a chemically retarded acid, an emulsified acid, or a combination thereof. When a concentrated mineral or organic acid is used in a capsule, it may be chemically retarded. A mixed acid is a mixture of acids, such as a mixture of any of the former acids.

A "gelled acid" as used is a type of retarded acid that is a gel structure and includes an acid and a gelling agent. A gelling agent may include, but is not limited to, xanthan polymers (XP), guar gum (GG), hydroxyethyl cellulose (HEC), carboxymethyl-hydroxyethyl cellulose (CMHEC), polyacrylamide (PAM), polyvinyl alcohol (PVA), polyvinylpyrrolidone (PVP), acrylamide/sodium-2-acrylamido-2-methylpropane sulfonate copolymer (PAM/AMPS), or a combination thereof.

A capsule may include a gelled acid, such as one obtained by core-shell hot melt extrusion or other methods known in the art (such as machine or hand tablet loading, gel-cap formation, etc.). A core-shell hot melt extrusion may be used to form a microcapsule. The capsule may be a shell forming material, including but not limited to, polyethylene, polypropylene, poly(1-butene), poly(methyl methacrylate), polyvinyl chloride, or a combination thereof.

The acid precursor may be a non-aqueous (not water soluble) ester compound that dissociates into its associated acid and alcohol in a de-esterification with water. The acid precursor hydrolyzes in the presence of water at elevated temperatures into an associated acid (and alcohol). Elevated temperatures include a temperature range of from about 60° C. to about 150° C. The associated acid and alcohol from de-esterification may be water soluble.

Suitable acid precursors include but are not limited to lactic acid derivatives, such as methyl lactate, ethyl lactate, propyl lactate, or butyl lactate; esters or formates that are water soluble or partially soluble, such as ethylene glycol monoformate, methyl formate, ethyl formate, methyl chloro formate, triethyl orthoformate, trimethyl orthoformate, ethylene glycol diformate, diethylene glycol diformate, glyceryl monoformate, glyceryl diformate, glyceryl triformate, or triethylene glycol diformate; formate esters of pentaerythritol; esters or polyesters of glycerol, such as tripropionin (a triester of propionic acid and glycerol) or trilactin; esters of acetic acid and glycerol, such as monoacetin, diacetin, or triacetin; esters of glycolic acid, such as ethyl, methyl, propyl, or butyl glycolate; esters of glycolic acid and polyols, such as glycerol and glycols; esters of oxalic acid; polymers or copolymers of any of the foregoing or the following, such as aliphatic polyesters, poly(lactides), poly(glycolides), poly(c-caprolactones), poly(hydroxybutyrates); poly(anhydrides), aliphatic polycarbonates, poly(amino acids); polyphosphazenes, poly(ortho esters), orthoesters (which may also be known as "poly ortho ethers" or "ortho ethers"), esters of propionic acid, esters of butyric acid; esters of monochloroacetic acid, esters of dichloroacetic acid, esters of trichloroacetic acid; derivatives thereof, or a combination thereof. Other suitable acid precursors include halide esters and esters of acids, such as esters of nitric acid, sulphuric acid, sulphonic acid, sulphinic acid, phosphoric acid, phosphorous acid, phosphonic acid, phosphinic acid, sulphamic acid, or a combination thereof.

The system includes one or more radiation source that is placed at or near the treatment location. The radiation source may be activated to selectively emit radiation. The radiation source may be a "natural radiation source," meaning a radioactive material that emits radiation, such as a chemical. The radiation may be an "artificial radiation source," meaning a device that emits radiation, including but not limited to a pulsed radiation generator (such as a pulsed neutron generator). The emitted radiation may activate a well treatment at a desired location downhole.

The radiation source may include a source for emitting gamma rays. Gamma radiation may provide a larger amount of energy into the fluid flow with sufficient depth of penetration compared to radiation other than gamma rays. For example, gamma (ray) radiation (one photon) has an energy range of $10^5$ electron-volts (eV) or more, whereas x-ray radiation (one photon) has an energy range of from $10^2$ to $10^5$ eV, ultraviolet (ray) radiation (one photon) has an energy range of from $10^0$ to $10^2$ eV, and neutron radiation (one particle) has an energy range of from $10^4$ to $10^7$ eV. Multiple radiation sources may be combined such that an energy range of $10^0$ eV or more, $10^2$ eV or more, or $10^4$ eV or more is provided. Gamma (ray) radiation may provide a sufficient depth of penetration, such as up to 10 to 15 cm, or 100 cm or less, dependent on the energy and material type.

Other radiation sources may also be used in combination with or separate from gamma rays. The radiation source emits radiation, for example, neutron, gamma, X-ray, or ultraviolet (UV). For example, the source may be a neutron source, such as neutrons emitted from a pulsed neutron generator, a gamma source, an X-ray source, an ultraviolet source (UV source), or a combination thereof. The parameters of the radiation source, such as the energy of neutrons, gamma rays, X-rays, or UV rays, are selected in such a manner that provides radiation emission for shell destruction.

The frequency range of the emitted radiation can vary depending on the radiation type, situation, application, etc. For example, gamma rays are electromagnetic waves with frequencies typically greater than $10^{19}$-$10^{20}$ Hz; X-rays are electromagnetic waves with frequencies in a range of about $10^{17}$-$10^{19}$ Hz; ultraviolet (UV) rays are electromagnetic waves with frequencies in a range of about $7.5*10^{14}$-$10^{16}$ Hz; neutron, alpha, and beta radiation are particles (not electromagnetic radiation) within the energy spectrum.

Electromagnetic radiation with a frequency of 50 to 1500 kHz is below visible range ($4*10^{14}$-$8*10^{14}$ Hz). In this range, depending on the capsule used, efficient degradation was observed for 100-300 kHz electromagnetic (EM) frequency (where EM frequency is applicable, such as not neutron, alpha, and beta radiation), but the effect was present at other frequencies as well.

The emitted radiation has a penetration depth that may vary based on the type of medium, the radiation type, and the intensity of the emitted radiation. For example, neutron flux is decreased in light water by about an order of magnitude, or about 10 centimeters (cm). So, a neutron source may be placed inside of tens of centimeters, such as 100 cm or less, 50 cm or less, 40 cm or less, 30 cm or less, 20 cm or less, or 10 cm or less away from the treatment location and is sufficient to treat the annulus.

Gamma radiation penetrates less depth compared to neutron radiation. A gamma source may be placed inside tens of centimeters, such as 100 cm or less, 90 cm or less, 50 cm or less, 40 cm or less, 30 cm or less, 20 cm or less, 10 cm or less, or 8 cm or less away from the treatment location and is sufficient to treat the annulus.

X-ray radiation penetrates less depth compared to gamma radiation. An x-ray source may be placed inside centimeters, such as 10 cm or less, 9 cm or less, 8 cm or less, 7 cm or less, 6 cm or less, 5 cm or less, 4 cm or less, 3 cm or less, 2 cm or less, or 1 cm or less away from the treatment location and is sufficient to treat the annulus.

UV radiation penetrates less depth compared to x-ray radiation. A UV source may be placed inside millimeters, such as 10 mm (1 cm) or less, 9 mm or less, 8 mm or less, 7 mm or less, 6 mm or less, 5 mm or less, 4 mm or less, 3 mm or less, 2 mm or less, or 1 mm or less away from the treatment location and is sufficient to treat the annulus.

The emitted radiation reacts with the capsules, resulting in a chemical reaction that may disintegrate or dissolve (or otherwise break apart) the shell of the capsule. Upon disintegration of the shell, contents within the capsule including the treatment agent may be released to the surrounding environment.

Method

The method may include preparing the well treatment composition, prior to introducing the system downhole.

In one or more embodiments, the method includes introducing a system downhole. The system includes a well treatment composition comprising a treatment agent, and a radiation source to a target location.

FIG. 1 shows a method of treating a wellbore or a hydrocarbon formation 100 comprising introducing a well treatment composition into a wellbore 102 and introducing a radiation source into the wellbore 104. The method may comprise activating the radiation source and emitting radiation at the target location 106. The method may comprise maintaining the wellbore to allow emitted radiation to react with the well treatment composition 108. The method may comprise allowing the radiation activated well treatment to disintegrate or dissolve, thereby releasing treatment agent from the well treatment composition at the target location 110.

The well treatment composition (comprising a treatment agent) may be introduced downhole using the wellbore circulation fluid, such as mud (drilling fluid). The well treatment composition comprising a treatment agent is positioned with wellbore fluid to reach the target location.

The radiation source may be introduced into the wellbore after the well treatment composition. The radiation source is introduced and positioned to the target location (treatment area). Alternatively, the radiation source may be introduced into the wellbore and positioned before the well treatment composition is introduced. The radiation source may be introduced into the wellbore with a tool, for example, with a winch or other suitable tool that may be introduced downhole.

Activating the radiation source is followed by a step of emitting radiation that intimately intermingles with the well treatment composition at the target location A step of activating the radiation source depends on the type of radiation source. For example, when a natural radiation source (radioactive material, chemical) is used, activating the radiation source includes introducing the radiation source downhole while the radioactive material is emitting radiation sufficient to provide a sufficient depth of penetration, to be described. When an artificial radiation source (such as a device that emits radiation) is used, activating the radiation source includes powering on the source, such as powering on a device using a wireline electrical cable. Other power sources may be used that would be appreciated by one of ordinary skill in the art. Upon activation of the radiation source, radiation is emitted, such as neutron, gamma, X-ray, ultraviolet (UV) radiation, or a combination thereof. The emitted radiation is configured to react with the well treatment composition, resulting in release of the treatment agent. For example, emitted radiation may react with a capsule, disintegrating or dissolving the shell and resulting in the release of an encapsulated treatment agent.

A single type of radiation source may provide more efficient activation on a particular amount of well treatment composition compared to an array of radiation sources. For example, a single radiation source may be matched with a particular well treatment composition to provide a reaction.

An array of radiation sources (multiple sources of the same or multiple types of radiation sources) may provide a greater affected volume and amount of released agent over an area compared to a single type of radiation source. When an array of radiation sources is included, the array may be activated simultaneously or in sequence. Further, individual radiation sources within a combination of radiation sources may be activated simultaneously or in series (for example, with a time delay).

The method may include activating the well treatment composition with the radiation source at the target location, to produce a radiation activated well treatment. The target location may be a treatment zone downhole, such as a borehole zone, a formation zone, or a combination thereof. Once the well treatment composition are proximate to the target location, the wellbore is maintained to allow the emitted radiation from the activated radiation source to react with the well treatment composition. Maintaining the wellbore may include avoiding shutting in the well, so that a tool including a radiation source may be operated. Thus, the method includes exposing the target location to (emitted) radiation. After a period, the emitted radiation reacts with and breaks up the well treatment that includes the treatment agent. The method includes releasing the treatment agent from the radiation activated well treatment. Upon breakage (disintegrate or dissolve) of the radiation activated well treatment, the treatment agent is released to the target location.

For example, activating the well treatment composition with the radiation source at the target location may include, but is not limited to, ultraviolet (UV) radiation that causes photooxidative degradation of polymer chains in, for example, a capsule in the well treatment composition. Degradation may result in breaking of polymer chains, reducing the molecular weight of polymer chains, deteriorating the mechanical properties of the polymer, and breaking down the shell of the capsule. Examples of such a polymer that may degrade include polystyrene (PS), polyvinyl chloride (PVC), and polyolefins such as polypropylene (PP) and polyethylene (PE), among others. Types of reactions may include but are not limited to UV radiation leading to damage and breaking of polystyrene chains; gamma radiation leading to the degradation of polyvinyl chloride chains; neutron radiation leading to the degradation of isobutylene-isoprene rubber, polymethyl methacrylate (PMMA), and polystyrene (PS). Chemical mechanisms of degradation may vary and may include but are not limited to chain scission or oxidation, for example.

Without wanting to be bound by theory, a gamma (ray) source may be advantageous to introduce due to both an ability to emit a greater amount of energy and a sufficient depth of penetration and capsule shell breaking ability compared to another radiation source. For example, a gamma source may penetrate to a depth of 90, 80, 70, 60, 50, 40, 30, 20, or 10 cm or less. A gamma source may provide $10^5$ electron-volts (eV) or more of energy and may have an ability to break a capsule shell because it is the highest energy and depth of penetration of electromagnetic radiation sources (including UV, x-ray, and gamma). A neutron source may have comparable energy and similar or greater depth of penetration as compared to a gamma source. The degradation effect of gamma radiation is comparable with that of neutrons. The choice between the radiation source that is used may be dictated by the sensitivity of the composition components to be irradiated.

The method may be useful for targeted descaling of a wellbore, such as in wellbores with scales. Scales may include barite scales and are appreciated by one of ordinary skill in the art. The descaling method includes a well treatment composition comprising a descaling agent. When applied.to descaling, the method may include releasing a treatment agent that includes a descaling agent for disrupting scale deposits in the target location.

A method of targeted descaling of a wellbore may include introducing a ball device with a radiation source (ball-activated radiation source) downhole and positioning the ball device at a target location. One of ordinary skill in the art would appreciate the operation of a ball device, such as a ball-activated fraccing tool completion device. A ball device may be a compact autonomous device that is dropped into the well at the well-head and travels inside the well. A ball device may be connected to a cable, such as a shielded wireline cable. A ball device may also be retrievable. Positioning of the ball device may be self-positioning or operator controlled. The ball device may include a fluid pressure pulse link to communicate signals by fluid pulse telemetry. For example, a fluid pressure pulse (step-change in the pressure) may be applied to the fluid in the borehole at the well-head. The fluid pressure pulse propagates through the fluid and may be used as a signal.

Once the ball device and radiation source is in position at the target location, the well treatment composition is introduced into the wellbore. The ball device may be commanded to activate the radiation source. Two ball devices may be used, for example, a first ball device may be used to introduce a radiation source and a second ball device may be used to introduce a well treatment composition. A well treatment composition may also be introduced by pumping from the top of the wellhead, or by releasing from a container carried by a tool (such as a tool lowered on a cable in the well). When the well treatment composition reaches the treatment location, the radiation source is activated, the emitted radiation reacts with the well treatment composition to form a resultant radiation activated well treatment. The treatment agent (descaling agent) is released upon breakage of the radiation activated well treatment. The signal for activating the radiation source may be received at the ball device via fluid pulse telemetry. The descaling agent that is released breaks apart scales at the target location.

The method may be useful for target location acidizing, such as with an acid stimulation treatment. Acidizing to restore or enhance productivity of a well or formation compared to without acidizing is appreciated by one of ordinary skill in the art. The acidizing method includes a well treatment composition comprising a treatment agent that includes an acidizing agent. When applied to acidizing, the method may include releasing an acid or acid precursor (as an acidizing agent) in a target location.

A method of targeted acidizing of a wellbore may include introducing a ball device with a radiation source downhole and position the ball device at a target location. Positioning of the ball device may be self-positioning or operator controlled. The ball device may include a fluid pressure pulse link to communicate signals by fluid pulse telemetry.

Once the ball device is in position at the target location, the well treatment composition is introduced into the wellbore. When the well treatment composition reaches the treatment location by flow, the radiation source is activated. The ball device may be commanded to activate the radiation source. The emitted radiation intimately intermingles with the well treatment composition to react with the well treatment composition and to form a resultant radiation activated well treatment. The treatment agent (acidizing agent) is released upon breakage of the radiation activated well treatment. The signal for activating the radiation source may be received at the ball device via fluid pulse telemetry. The acidizing agent that is released stimulates the wellbore and formation at the target location.

The ball device and the radiation source may be configured to allow emitted radiation to penetrate into the formation at the target location. Thus, the acidizing treatment may be released inside the formation, compared to both inside the wellbore and inside the formation. Without wanting to be bound by theory, releasing the acidizing treatment inside the formation may increase a depth of penetration of the treatment agent or ensure that the treatment agent is positioned at the desired distance away from the wellbore (at the target location). A desired distance away from the wellbore may be from 1 cm to 100 cm, such as from 2 cm to 80 cm, from 5 cm to 50 cm, from 5 cm to 25 cm, from 5 cm to 15 cm, or from 1 cm to 10 cm.

When the system of one or more embodiments is applied, a lesser amount of well treatment composition may be used compared to a system or method that is not targeted. Meaning, the system and method of one or more embodiments may avoid losing well treatment composition to a zone or a location other than the target location.

In one or more embodiments, a combined treatment may be used. For example, a descaling treatment and an acidizing treatment may be combined into a single wellbore treatment composition and method.

The system of one or more embodiments also provides control over targeting the activation of a well treatment composition, such as the ability to control well depth activation and depth of penetration activation into a formation. In this way, the system and method of one or more embodiments allows targeted activation control at two or three axis through-space.

Further, the system of one or more embodiments prevents premature activation (action) of treatment agent downhole by controlling the ability to activate a well treatment composition via a radiation source.

Lastly, the system of one or more embodiments may advantageously operate without shutting in the well.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

The term "substantially", when used, refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Ranges may be expressed as from about one particular value to about another particular value, inclusive. When such a range is expressed, it should be understood that another embodiment is from the one particular value to the other particular value, along with all particular values and combinations thereof within the range.

Although only a few example embodiments have been described in detail, those skilled in the art will readily appreciate that many modifications are possible in the example embodiments without materially departing from this disclosure. All modifications of one or more disclosed embodiments are intended to be included within the scope of this disclosure as defined in the following claims. In the claims, means-plus-function clauses are intended to cover the structures previously described as performing the recited function, not limited to structural equivalents, but also equivalent structures. It is the express intention of the applicant not to invoke 35 U.S.C. § 112(f) for any limitations of any of the claims, except for those in which the claim expressly uses the words 'means for' together with an associated function.

While one or more embodiments of the present disclosure have been described with respect to a limited number of embodiments, those skilled in the art, having benefit of this disclosure, will appreciate that other embodiments can be devised, which do not depart from the scope of the disclosure. Accordingly, the scope of the disclosure should be limited only by the attached claims.

What is claimed:

1. A system, comprising:
a well treatment composition comprising a delivery fluid,
   a capsule within the delivery fluid, and a treatment
   agent solution within the capsule,
   wherein the treatment agent solution comprises an
      emulsion comprising one or more selected from the
      group consisting of an oil-in-water emulsion, a
      water-in-oil emulsion, a water-in-oil-in-water emulsion, and an oil-in-water-in-oil emulsion, and
      wherein the emulsion includes an internal phase
      comprising the treatment agent,
   wherein the treatment agent solution includes a treatment agent comprising one or more selected from the
      group consisting of a scale dissolver, a scale inhibitor, a hydrate inhibitor, a halite inhibitor, a corrosion
      inhibitor, a biocide, a wax control substance, an
      asphaltene control substance, a demulsifier, a gel
      breaker, a drag reducer, an oxygen scavenger, a
      foaming agent, a surfactant, an acid treatment, and a
      well clean up substance,
   wherein the capsule comprises a polymer shell configured to degrade when exposed to radiation, and
   wherein the polymer shell comprises one or more
      selected from the group consisting of melamine-
      formaldehyde, an urea-formaldehyde, a phenol-
      formaldehyde resin, a melamine-phenol-formalde-
      hyde resin, a furan-formaldehyde resin, an epoxy
      resin, a polysiloxane, a polyurethane, a polyether, a
      polyimide, a polyolefin, a gelatin, a gelatin derivative, a starch, a starch derivative, an ethylene-viny-
      lacetate copolymer, a maleic-anhydride based copolymer, a polyacrylamide, a polyacrylamide based
      copolymer, a polyvinylpyrrolidone, a polyvinylpyr-
      rolidone based copolymer, a propylene-acrylate
      copolymer, a propylene-methacrylate copolymers,
      an oxidized polypropylene, an oxidized polyethylene, a propylene-ethylene oxide copolymer, a sty-
      rene-acrylate copolymer, and an acrylonitrile-buta-
      diene-styrene copolymer; and
a radiation source external to the well treatment composition comprising one or more selected from the group consisting of a neutron source, a gamma source, an X-ray source, and an ultraviolet source.

2. The system of claim 1, wherein the delivery fluid comprises water, a delivery fluid surfactant, or a mixture thereof.

3. The system of claim 1, wherein the treatment agent solution further comprises one or more selected from the group consisting of a suspension, a polymer filler, and a combination thereof.

4. The system of claim 3, wherein the suspension comprises a solid material and a liquid component, where the solid material comprises the treatment agent, and where the liquid component is one or more selected from the group consisting of acetone, benzene, methanol, diethyl ether, and a combination thereof.

5. The system of claim 4, wherein the solid material further comprises one or more selected from the group consisting of ethylenediaminetetraacetic acid (EDTA), diethylenetriaminepentaacetic acid (DTPA), tetrasodium glutamate diacetate (GLDA), sulfamic acid, and a combination thereof.

6. The system of claim 3, wherein the treatment agent is embedded in the polymer filler, and1 where the polymer filler comprises one or more selected from the group consisting of an addition polymer of vinyl monomers, a condensation polymer of monomers, and a condensation polymer of prepolymers.

7. The system of claim 6, wherein the addition polymer of vinyl monomers comprises one or more selected from the group consisting of acrylamide, acrylic acid, acrylic esters, methacrylic acid, methacrylic esters, styrene, 4-vinylbenzyl chloride, divinylbenzene, and methylenebisacrylamide.

8. The system of claim 6, wherein the condensation polymer of monomers comprises one or more selected from the group consisting of melamine-formaldehyde resin, phenol-formaldehyde resin, urea-formaldehyde resin, epoxy resin, urethane resin, urea resin, urethane/urea resin, and polyester resin.

9. The system of claim 6, wherein the condensation polymer of prepolymers comprises one or more selected from the group consisting of a methylene diphenyl diisocyanate (MDI)-based prepolymer or a toluene diisocyanate (TDI)-based prepolymer.

10. The system of claim 1, wherein the scale dissolver comprises one or more selected from the group consisting of an acid-based scale dissolver and a chelant-based scale dissolver.

11. The system of claim 1, wherein the acid treatment comprises one or more selected from the group consisting of a mineral acid, a powdered acid, a mixed acid, a retarded acid, and an acid precursor.

12. The system of claim 11, wherein the retarded acid is a gelled acid.

13. A method of treating a wellbore or a hydrocarbon formation, comprising:

introducing a well treatment composition comprising a treatment agent solution encapsulated within a polymer shell downhole to a target location in a delivery fluid comprising wellbore circulation fluid, wherein the treatment agent solution comprises a treatment agent and an emulsion comprising one or more selected from the group consisting of an oil-in-water emulsion, a water-in-oil emulsion, a water-in-oil-in-water emulsion, and an oil-in-ater-in-oil emulsion, and wherein the emulsion includes an internal phase comprising the treatment agent; and wherein the polymer shell comprises one or more selected from the group consisting of melamine-formaldehyde, an urea-formaldehyde, a phenol-formaldehyde resin, a melamine-phenol-formaldehyde resin, a furan-formaldehyde resin, an epoxy resin, a polysiloxane, a polyurethane, a polyether, a polyimide, a polyolefin, a gelatin, a gelatin derivative, a starch, a starch derivative, an ethylene-vinyl-lacetate copolymer, a maleic-anhydride based copolymer, a polyacrylamide, a polyacrylamide based copolymer, a polyvinylpyrrolidone, a polyvinylpyrrolidone based copolymer, a propylene-acrylate copolymer, a propylene-methacrylate copolymers, an oxidized polypropylene, an oxidized polyethylene, a propylene-ethylene oxide copolymer, a styrene-acrylate copolymer, and an acrylonitrile-butadiene-styrene copolymer;

introducing a radiation source into the wellbore and positioning the radiation source at the target location;

activating the radiation source and emitting radiation that intimately intermingles with the well treatment composition at the target location, wherein the emitted radiation is one or more selected from the group consisting of neutron, gamma, X-ray, ultraviolet (UV), and a combination thereof;

maintaining the wellbore to allow emitted radiation from the activated radiation source to react with the well treatment composition, thereby forming a radiation activated well treatment composition; and allowing the radiation activated well treatment composition to disintegrate or dissolve, thereby degrading the polymer shell, breaking encapsulation and releasing treatment agent at the target location.

14. The method of claim 13, wherein the well treatment composition comprises a scale dissolver.

15. The method of claim 13, wherein the well treatment composition comprises an acid treatment.

16. The method of claim 13, wherein the emitting radiation has a depth of penetration of between 1 mm and 100 cm.

17. The method of claim 13, wherein the emitting radiation has an energy range of between $10^0$ eV and $10^7$ eV.

* * * * *